Patented Mar. 9, 1954

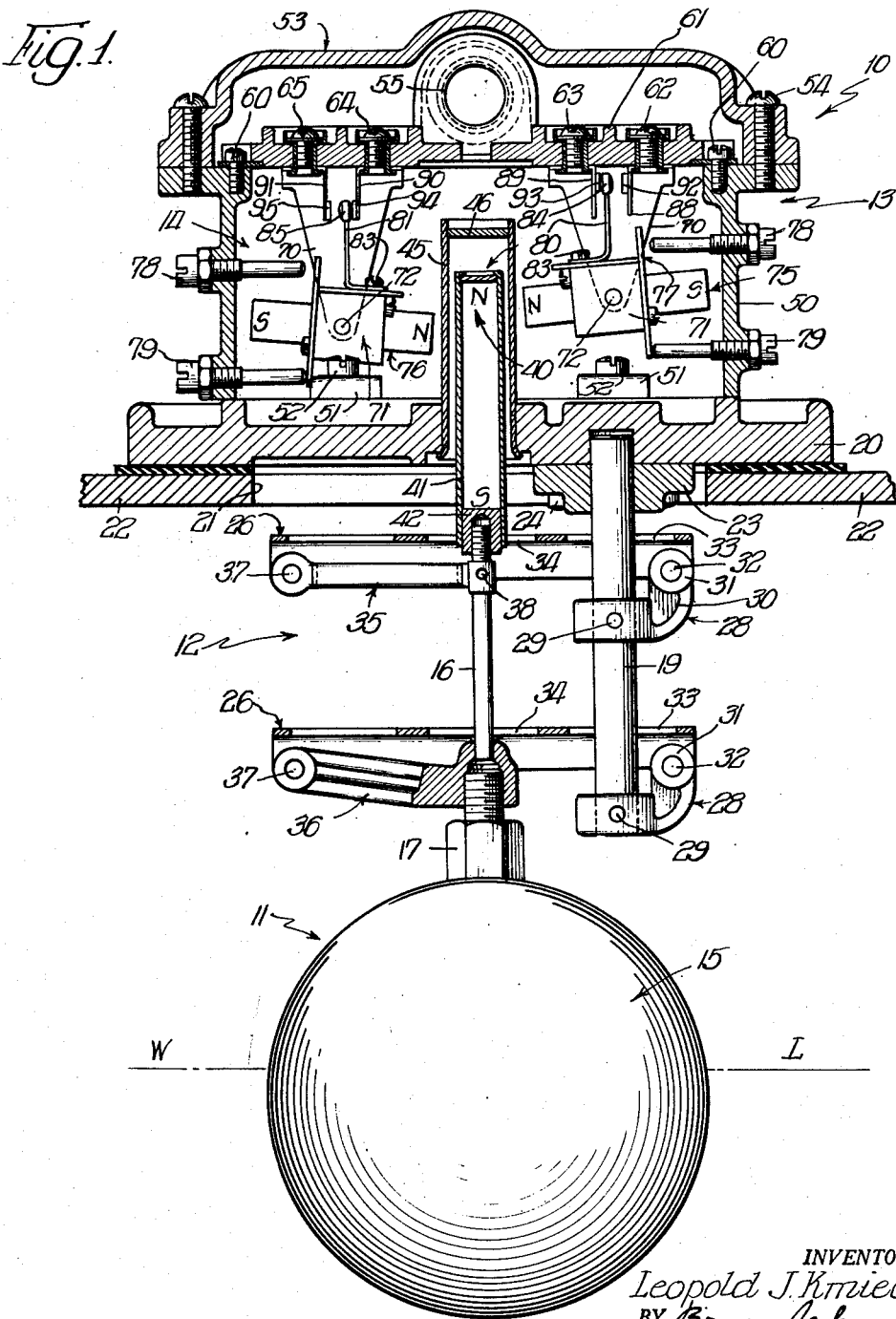

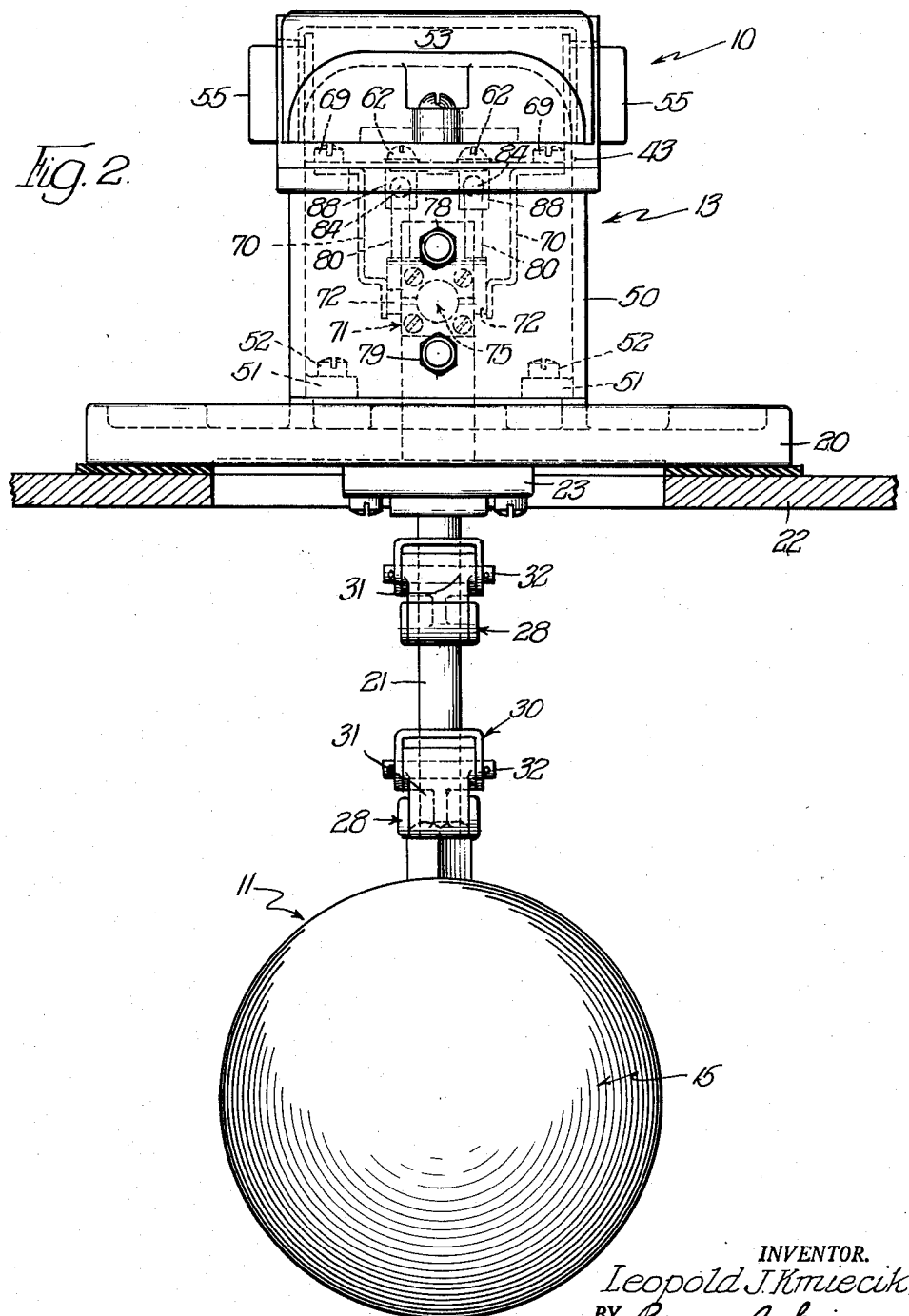

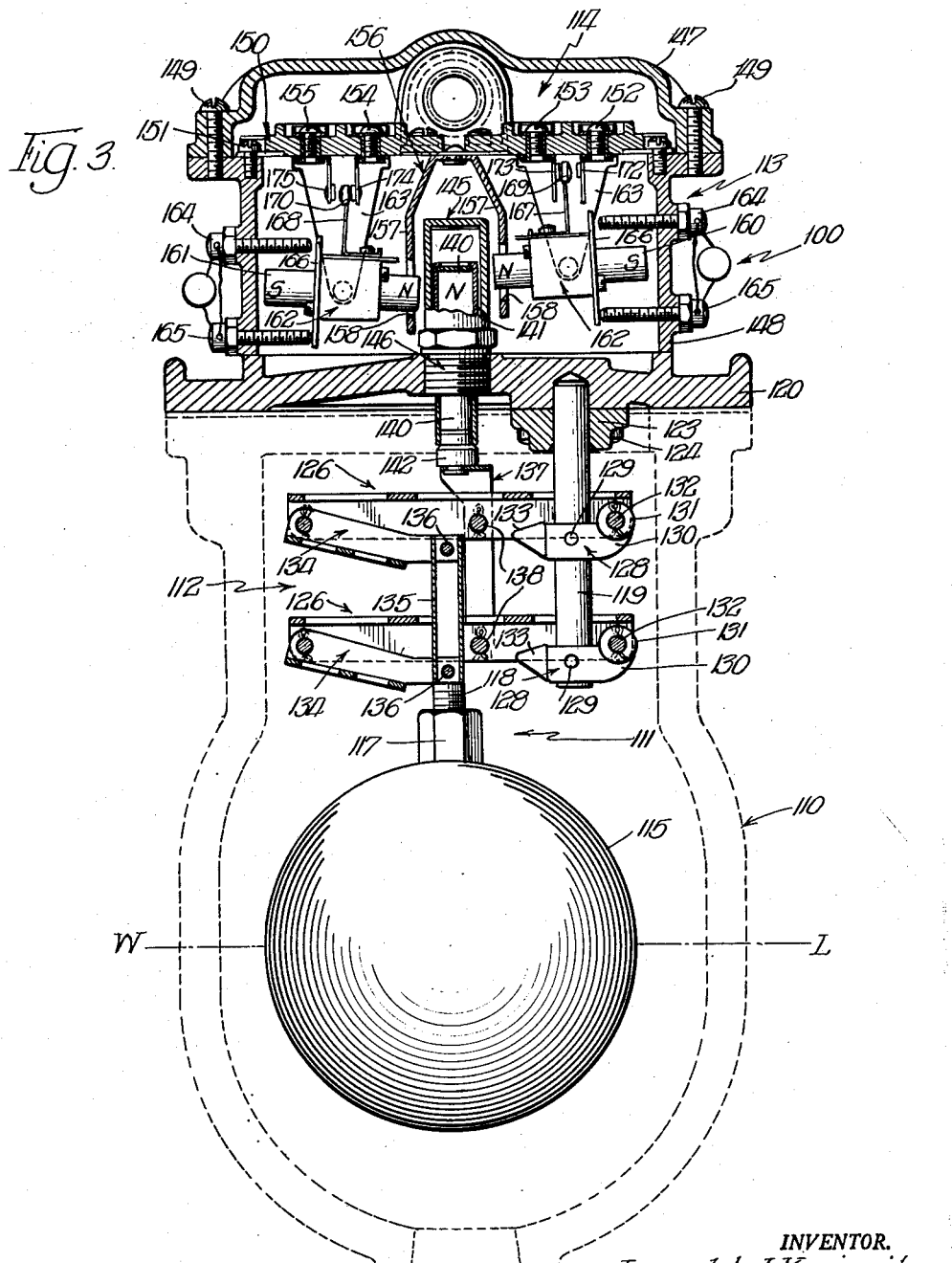

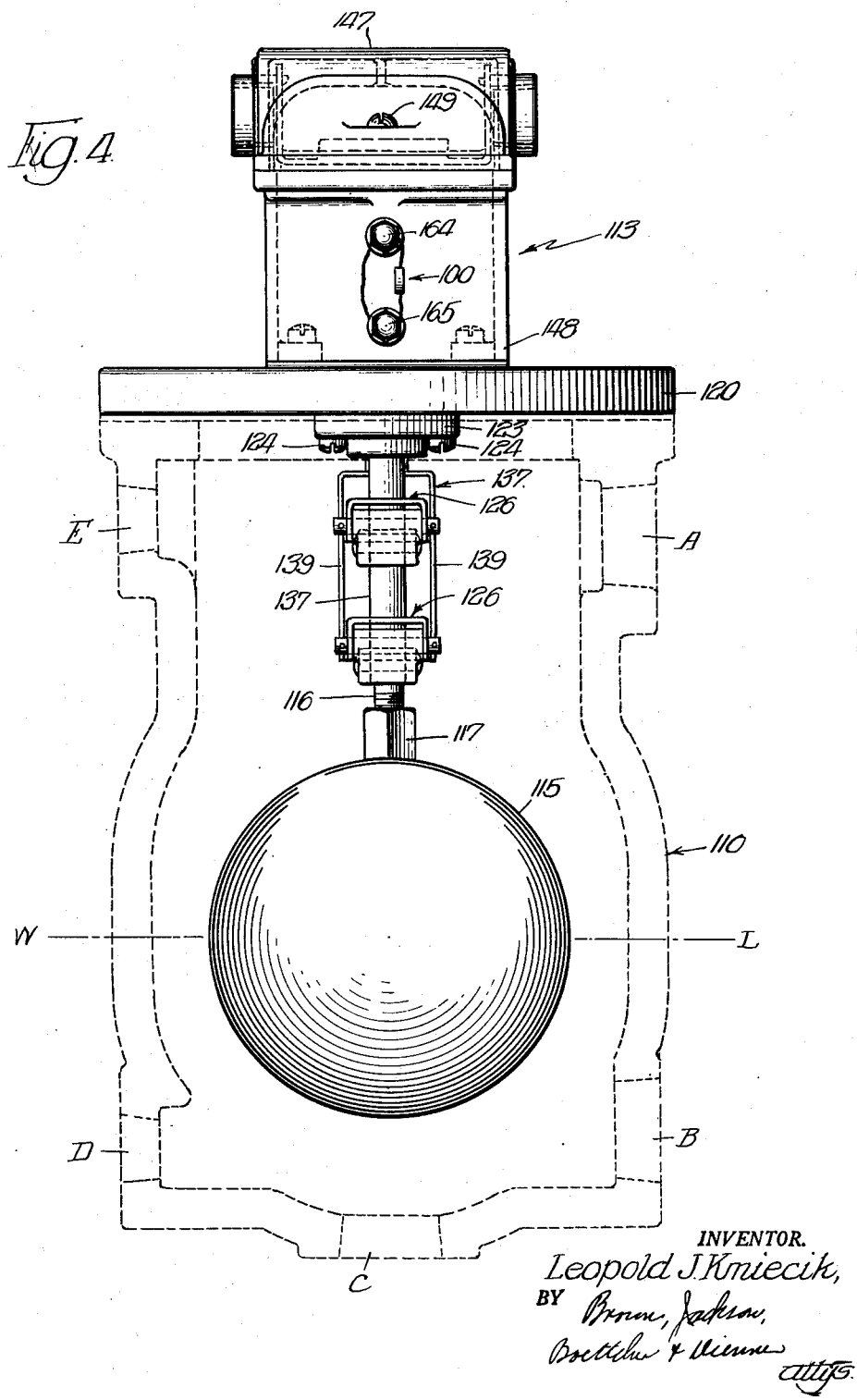

2,671,834

UNITED STATES PATENT OFFICE 2,671,834

LEVEL CONTROLLED SWITCH MECHANISM

Leopold J. Kmiecik, Chicago, Ill., assignor to McDonnell & Miller, Inc., Chicago, Ill., a corporation of Delaware Application January 23, 1952, Serial No. 267,891

8 Claims. (Cl. 200—84)

The present invention relates to control mechanism for switches adapted to be actuated by means responsive to variations in liquid level or other means responsive to one or more variables in which the variation is gradual. The present invention finds its preferred embodiment in a high pressure, low water, cutoff and pump control mechanism for boilers and the like.

Certain of the teachings are applicable to the operation of control elements, such as switches which are subject to control in accordance with liquid level in various pressure vessels, such, for instance, as boilers, stills and other liquid containers subject to pressure and/or temperature. The switch operating mechanism is useful for operating, with snap action, one or more switches by motion of a member which moves through a range of positions of greater amplitude than that of the movable switch member. Certain other phases of the invention are applicable generally to securing response of a switch or valve to fluctuations of position of a controlling member whether the same be due to liquid level or other phenomenon, particularly where the controlling member is separated from the switch or valve actuating mechanism by an intervening fluid tight wall.

Switches and valves responsive to variations in level of water or other liquids in a steam boiler are known. The most widely utilized devices on the market at present involve the use of a flexible metal bellows for sealing the joint between the movable part and the pressure enclosure in which the float is contained, and wherein pressure is to be retained. For low pressure work, the use of the flexible bellows as a seal for the motion transmitting parts is satisfactory, but when high pressures, such as 250 pound gauge or higher is involved, the metal bellows seal is inadequate, since the area exposed to pressure develops forces which the metal bellows seal cannot adequately sustain or the float mechanism cannot overcome.

It is an aim of the present invention to provide a sealed float responsive switch actuating mechanism capable of satisfactory operation under pressures which cannot satisfactorily be withstood by flexible metal bellows or other known sealing means now customarily employed for low pressure work. While low pressure and high pressure are relative terms, there is certainly a difference in the problem presented by a heating boiler with a guage pressure of 15 to 20 pounds and a power boiler carrying a guage pressure of 250 pounds. Many municipal codes require an engineer in attendance of a boiler carrying steam pressure in excess of 15 pounds gauge, but do not require an engineer for a boiler carrying 15 pounds or less. Also in regard to temperature, it is apparent that a level responsive means which would be satisfactory for a low pressure heating boiler might not be adequate for a high temperature cracking still for petroleum fractionation or destructive distillation where the temperatures might be high enough to cause loosening of solders or affect the strength or flexibility of the metal of the bellows.

Another aspect of the present invention, which is of marked advantage, is the novel organization and arrangement of the elements of the magnet system therein for causing the operation of a switch actuator located outside the pressure vessel, in response to motion of a magnetic member inside the pressure vessel. Another novel feature of the mechanism embodying the present invention is a new arrangement of two or more magnetic switch actuating members responsive to a common magnetic member which moves in response to water level change or other variable controlling phenomena. According to the present invention, it is possible to arrange two or more such switch actuators to be operated successively and without interference with each other, each independently adjustable as to the differential within which the same may respond. The primary magnetic member which moves in accordance with water level changes may have a substantially longer travel than the travel of the switch actuator or secondary magnetic member. The present invention also permits adjustment of the range of response of the secondary magnetic member.

Another novel feature of the magnetic system of the present invention resides in the biasing means for holding the switch actuator or secondary magnetic members in either of two extreme positions so as to insure adequate and reliable contacting pressure between a movable contact carried by the secondary magnet and stationary contacts of the switch means which is actuated thereby. This biasing means is, in the preferred embodiment, a pair of magnetic armature members which are also utilized as adjusting screws or stop screws for controlling the differential within which the switch actuator magnet is permitted to move.

A basically new feature of the present invention resides in the disposition of the level actuated primary magnetic member in an air or vapor dome above the level of the liquid whereby the air gap within which the primary magnetic member is caused to move will not be subject to the deposit of solids from the boiler water or other liquid involved in the installation, nor will magnetic particles, such as iron particles or scale, be carried by the boiler water or other liquid into such air gap where it might clog the motion of the said magnetic member.

A still further feature of novelty resides in the relative position and motion of the switch actuating secondary magnetic member and the level responsive primary magnetic member. In the preferred embodiment, the level controlled primary magnetic member is caused to be moved up and down vertically in a substantially straight line, as by a parallel motion linkage, whereas, the switch actuating secondary magnet swings up and down on a horizontal pivot. The magnetic members present like poles nearest to each other, and the actuation of the switch actuating secondary magnet by the primary magnet is by a repulsion effect of like poles. The advance of the end of the level responsive primary magnet past the center of the pole of the switch actuating secondary magnet produces a sharp reversal of forces at a very definite point or position in the motion of the movable level responsive member to throw the switch with a snap action. This latter feature is accentuated by the biasing armatures, which hold the switch actuating magnet in either extreme position, provide a retarding force which holds the secondary magnet up to a certain definite point, and then very sharply yields and decreases as the primary magnet passes the center of the magnetic field of the adjacent pole of the secondary magnet.

The device of my invention may be organized to be located directly on the boiler, as, for example, at the central part of the same in connection with a marine boiler, so as to be subject to a minimum of oscillation due to variations in water level from the motion of the ship. It also may be mounted on any boiler or pressure vessel in such position that the float lies on the design water level. The mechanism further may be disposed in, or as a part of, an auxiliary float chamber connected to the boiler so as to have the level therein respond to the level in the boiler. Also, the device of my invention may be provided with means for damping the motion of the level responsive magnet or of reducing the actual motion of the same by motion reducing means.

There are certain other novel features in the details of construction which will become apparent from the following description and from the claims hereto appended.

Now in order to acquaint those skilled in the art with the manner of constructing and operating a device embodying my invention, I shall describe, in connection with the accompanying drawings a specific embodiment of the same and its mode of use.

In the drawings:

Figure 1 is a front elevational view in cross section illustrating a first embodiment of my new and improved level controlled switch mechanism bearing the novel features of my invention;

Figure 2 is an end elevational view of the mechanism illustrated in Figure 1 of the drawings;

Figure 3 is a front elevational view in cross section of a second embodiment of my new and improved level controlled switch mechanism bearing certain improved modifications therein over the mechanism illustrated in Figures 1 and 2 of the drawings; and Figure 4 is an end elevational view of the mechanism illustrated in Figure 3 of the drawings.

Turning now to the details of the mechanism as illustrated in Figures 1 and 2 of the drawings, it will be recognized that a mechanism 10, therein illustrated, comprises generally a float assembly 11, a parallel linkage assembly 12, a switch housing 13 and a switch assembly 14 contained within the housing 13.

The float assembly 11 is composed generally of a spherical, hollow float member 15 made of stainless steel, or like corrosive resistive material and to which is attached a cylindrical actuating rod 16 by means of a suitable connector 17. It will be noted that the actuating rod 16 projects outwardly of one side of the float member 15 and is to be supported in a substantially vertical position for rectilinear actuation by means of the parallel linkage assembly 12 as will now be described.

The parallel linkage assembly 12 includes a vertical support post 19; the upper end of which is received and connected to the underside of a substantially circular pressure closure plate 20, atop of which the switch housing 13 is mounted, and which is anchored over an opening 21 formed in a boiler wall 22. To facilitate ready attachment of the upper end of the support post 19 to the closure plate 20 at a position offset from the central axis thereof, a collar member 23 is utilized, such being press fitted or keyed to the upper end of the support post 19 and attached to the underside of the closure plate 20 by means of suitable stud bolts 24 or the like. It will be noted that the extreme upper end of the support post 19 is received in a piloting opening formed for that purpose in the closure plate 20. A pair of bifurcated arms 26—26 are supported in substantially horizontal parallel spaced relation for pivotal movement on the vertical support post 19 by means of a pair of spaced mounting collar members 28 which are rigidly connected to the support post 19 by means of cross connecting pin members 29. Each of the supporting collars 28 is provided with an upwardly extending arm portion 30 having a trunnion member 31 positioned transversely of its upward end for pivotal connection with a bifurcated arm 26 by means of a trunnion pin 32. It will be noted that each of the bifurcated arms 26 is provided with an opening 33 adjacent one end for the reception therethrough of the vertically disposed support post 19. Further, each arm 26 is provided with a central opening 34 for receiving the vertically disposed actuating rod 16 to permit the free pivotal movement of the bifurcated arms relative to the support post and the actuating rod.

Connected to the outer, or freely movable end, of each of the bifurcated arms 26 and thereabeneath is one of a pair of short connecting rods 35 and 36. The upper connecting rod 35 is pivotally joined at one end to the upper bifurcated arm 26 by pivot pin 37 for free pivotal movement relative thereto, and in an arcuate direction opposite therefrom. The lower connecting rod 36 is likewise pivotally supported on the freely movable end of the lower bifurcated arm by means of a similar pivot pin 37 for like parallel movement with rod 35. Further the lower connecting rod is somewhat angularly offset in configuration while the upper connecting rod 35 is a straight rod. Each of the connecting rods 35 and 36 is rigidly connected at its inner end to the cylindrical actuating rod 16 so that the two rods move in parallelism carrying the actuating rod vertically therewith. Specifically, the upper connecting rod 35 is connected to actuating rod 16 by means of a connecting pin member 38 and the lower connecting rod 36 is connected to the actuating rod by an internally threaded collar formation at its inner end which threads onto the connector 17 associated with float member 15.

Since the conditions under which the float and linkage assembly 11 and 12, respectively, operate are such as to cause marked deterioration and corrosion thereof in the presence of the liquids and atmosphere within the boiler chamber into which such are inserted, it is preferable that the various parts of these two assemblies be made of a suitable anti-rust or non-corrosive material, such as stainless steel, brass or various copper alloys. Further, it will be appreciated that since it is desired that the float assembly be movable with a substantially vertical rectilinear motion, the parallel linkage assembly gives rise to the desired actuation of the float assembly while supporting such in a compact and efficient manner. In particular it will be appreciated that since the actuating rod is supported on the support post 19 by means of the oppositely directed connecting rods and bifurcated arms, the latter of which are pivotally connected at one end to the support post and reach across the path of movement of the actuating rod, the path of movement of the float assembly is parallel to the chordal paths described by the arcuate travel of the parallel arranged bifurcated arms. Since the bifurcated arms 26 are of a substantially extended length and are arranged to describe a large radius of movement, it will be appreciated that within the travel limits for which the float assembly and linkage assembly are designed to operate, the movement of the float assembly is substantially rectilinear and vertically up and down as desired.

In order that the float assembly, which is responsive to variations in liquid levels within the boiler, might be effective for actuating the control switch assembly 14 housed within the switch housing assembly 13, a primary magnet 40 is mounted coaxially at the upper end of the actuating rod 16. To this end the bar magnet 40 is housed within a non-magnetic sleeve 41, made of brass, bronze or other suitable non-magnetic material, and is provided with an internally threaded plug 42 at its lower end for threading connection with the upper end of actuating rod 16, as illustrated.

To enable the bar magnet 40, which is rectilinearly movable with the float assembly, to move within the switch housing assembly 13 in actuating the switch assembly 14, I have provided an upwardly extending tubular air or vapor dome 45 located centrally of and extending through the closure plate 20. The dome 45 acts as an effective seal for isolating the interior of the switch housing 13 from the high pressures existent within the boiler into which the float and linkage assemblies extend. It will be appreciated that the vapor dome 45 comprises a substantially tubular non-magnetic brass or bronze member sealed at its upper end by a wall member 46 and open at its lower end for the axial reception therein of the upwardly extending primary magnet 40. This arrangement effectively seals off the interior of the switch housing 13 from the atmosphere and pressure within the boiler to which the mechanism 10 is attached. To insure a completely tight junction between the tubular air or vapor dome 45 and the closure plate 20, these two members may be brazed or otherwise tightly interconnected to form an air tight seal therebetween.

The switch housing 13 comprises a substantially rectilinear box-like wall section 50 comprising four rectangularly arranged walls suitably connected to the closure plate member 20 by means of interiorly disposed pads 51 and connecting studs 52 threadingly received in the closure plate 20. The upper end of the housing section 50 is provided with a suitable closure cover 53 configured to conform with the plan shape of the housing section 50 and joined thereto by a plurality of interconnecting threaded stud bolts 54 or the like. To enable one to electrically connect the switch assembly 14, housed in the switch housing assembly 13, suitable conduit entries 55—55 are provided in the cover member 53 for the reception of current conducting conduits in a conventional manner.

Disposed beneath the top cover plate 53 and connected to the housing section 50 by a plurality of stud bolt connectors 60 is an insulated terminal plate 61 carrying pairs of terminal connectors screws 62, 63, 64 and 65; there being eight such terminal connector screws provided in the particular embodiment of the mechanism illustrated herein, with such being arranged in coacting pairs bearing like numbers in Figures 1 and 2. It will be appreciated that the pairs of terminal connector screws 62 and 63 are arranged in a separated group of four from a like group of four comprising the pairs of terminal connector screws 64 and 65, such two groups being disposed on opposite sides of the insulated terminal plate 61, as shown in Figure 1.

Mounted in depending relation, immediately below each of the groups of terminal connector screws and connected to the terminal plate 61 by means of stud bolts 69, 69 are cooperating pairs of spaced bracket arms 70, 70 for supporting secondary switch magnets 75 and 76 for pivotal movement therebetween. In particular it will be recognized that each of the cooperating pairs of depending bracket arms 70 pivotally support a magnet housing 71 between the lower ends thereof by means of pivot pin member 72. Each of the magnet holding brackets 71 receives a secondary bar magnet 75 or 76 axially therethrough and tightly grips the same so that the magnet moves pivotally with its supporting bracket member between the dependingly arranged support arms 70, 70. To accommodate the best performance of the mechanism of my invention it is preferable that the secondary magnets 75 and 76 be arranged so that they have like poles adjacent opposite sides of the air dome 45, with such like poles being of like polarity with the upper pole of the primary bar magnet 40 carried at the upper end of the actuating rod 16. By this arrangement actuation of the secondary magnets by the primary magnet is effected through repulsion, as will be amplified later herein. Further, each of the secondary magnet holding brackets 71 is provided with a transversely extending limit bar 77 positioned adjacent the side walls of the switch housing section 50.

In order that the pivotal movement of the secondary magnets may be limited to desired values, cooperating pairs of vertically displaced adjusting screws 78 and 79 are threadingly arranged through the side walls of the housing section 50 to project inwardly of the latter for providing adjustable limit stops which contact the transverse stop plate 77 of the associated secondary magnet mounting means to limit the pivotal throw of the secondary magnets. It is preferable that the stop screws 78 and 79 be of a magnetic material so that there is attractive coaction between each of the stop screws and the adjacent polar end of the secondary bar magnet 75 or 76 associated therewith. This latter feature insures positioning of the secondary magnets at their throw limits to gain positive and steady contact pressure between the switch actuating means carried by the secondary magnets and the stationary contacts of the switch assembly, as will appear presently.

Mounted to the upper side of each of the secondary magnet holding brackets 71 are the immediate switch closing means referred to above, comprising pairs of resilient contact arms 80 and 81 associated with their respective magnets 75 and 76. As will be appreciated from an examination of Figure 2 of the drawings in particular, each of the contact arms 80 and 81 comprises a resilient leaf-like member attached to one of the magnet holding brackets by stud bolts 83 and extending transversely upward therefrom. Each of the contact arms further is provided with a silver contact button at its upper end, as buttons 84, 84 on the contact arms 80, or buttons 85, 85 as on contact arms 81. The associated or paired contact arms are further interconnected at their lower ends and made of a suitable electrical conductor material. Other forms of the contact arms 80 and 81 may be used so long as the essential principle involved therein of having a construction capable of bridging the separated pairs of contact terminals 62 through 65 is assured for closing circuits therethrough. The several pairs of contact terminals numbered 62–65 are provided at their lower ends with dependingly mounted contact supporting fingers 88, 89, 90 and 91, respectively, which support silver contact buttons 92, 93, 94 and 95 aligned properly to permit circuit closing contact with the pairs of silver contact buttons 84 and 85 mounted at the upper ends of the arcuately movable contact arms 80 and 81.

From the above it will be recognized that rocking actuation of the secondary magnet 75 in the appropriate direction permits alternate circuit closure between the cooperating pairs of contact buttons 92 associated with the paired terminals 62, 62 or circuit closure through contact buttons 89 associated with the paired terminal connectors 63, 63. Likewise rocking actuation of magnet 76 permits circuit closure between contact buttons 94 connected to terminals 64, 64 or contact closure between terminal buttons 95 associated with terminal connectors 65, 65.

In the preferred installation of a level responsive switch mechanism 10, as I have set forth above, the pair of contact terminals 62 are designed to be connected in series with a relay coil or the like in a contact starter associated with the water supply pump of the boiler. The pair of separated contact terminals 63 are to be connected in circuit with a visual or audible alarm system of a conventional design, for indicating the operating condition of the boiler's water supply pump. The separated contact terminals 64 are to be connected in circuit with the contact starter or relay associated with the burner circuit of the boiler so that when such are bridged by the coacting contact arms 81 to close circuit therethrough, operation of the burner will take place. In order to indicate the operating condition of the boiler's burner, the contact terminals 65 are connected in circuit with a second visual or audible alarm signal system to indicate to the operator whether or not the burner is in operation. Other arrangements and connection of the several terminals provided in the switch assembly may be utilized readily and will be suggested to one familiar with this art, since the specific uses to which such have been applied herein are for illustrative purposes only and are not intended to be a restriction on the use of my mechanism.

In the normal operating condition of the boiler and my mechanism, as illustrated in Figure 1 of the drawings, it will be noted that the polar end of the primary magnet 40, herein illustrated as being the north polar end thereof, is positioned slightly above the center of the secondary magnets 75 and 76. Further it will be appreciated that secondary magnet 75 is positioned slightly above the secondary magnet 76; this latter feature to bring about a desired sequential operation of the switch circuits as will be explained presently. In this position of the several magnets, 40, 75 and 76, the north polar end of the primary magnet 40, being slightly above the axis of the north polar end of the secondary magnet 75, causes a counterclockwise rotation of the latter magnet 75, as viewed in Figure 1, due to the repulsive effect between the like poles thereof. Therefore, it will be recognized that when the pair of connective terminals 63 have their contact buttons 93 bridged by the pair of contactor arms 80, circuit is closed therebetween to energize the visual or audible alarm system associated with the water supply pump of the boiler. Further, in this condition of circuit closure through contacts 63, the stop bar 77 associated with magnet 75 abuttingly engages the lower regulating screw 79 positioned adjacent thereto to bring the south polar end of magnet 75 adjacent the upper stop screw 78 for magnetic attraction therewith. Likewise, the secondary magnet 76, with its north polar end adjacent the air dome 45, is repulsed by the north polar end of the primary magnet 40 to move the contactor arms 81 clockwise thereby closing circuit between the contact buttons 94 to turn on the boiler's burner. So long as the water level, designated WL in Figure 1, is maintained at the designed operating level as illustrated, the above described Figure 1 conditions of the switch assembly prevail. Upon a gradual lowering of the water level within the boiler, however, the float assembly moves responsively downwardly until the north polar end of the magnet 40 eventually passes below the central axis of the secondary magnet 75. At that stage the repulsive influence between the adjacent polar ends of the primary magnet and secondary magnet 75 overcomes the magnetic attraction between the south polar end of magnet 75 and the upper adjusting screw 78 to pivotally actuate the contact arms 80 clockwise closing the circuit through contacts 92 to energize the water supply pump. This latter movement is accelerated somewhat by the magnetic attraction between magnet 75 and the adjacent adjusting screw 79, as the south polar end of magnet 75 moves out of its magnetic attractive position with the uppermost adjusting screw 78 and approaches a magnetic attractive position with the lowermost adjusting screw 79. Also it will be appreciated that once contact is closed through contacts 92 or 93, the attraction of the magnet 75 for the adjacent adjusting screw serves to maintain good contact pressure between the movable and stationary contacts to eliminate contact flutter in the switch assembly. Upon closure of the circuit through the terminal connectors 62, the water supply pump furnishes water to the boiler to raise the water level therein.

If the movement of the float assembly continues downwardly to a point where the north polar end of primary magnet 40 passes the axis of the secondary magnet 76, repulsive effect between the like polar ends of the primary magnet and the secondary magnet 76 causes a corresponding counterclockwise actuation of the secondary magnet 76. This movement serves to open the circuit through terminal connectors 64, shutting down the boiler's burner followed by a bridging of the contact buttons 95 to close the circuit through the terminal connectors 65 for energizing the visible or audible alarm system in circuit therewith, indicating the shutting off of the burner. Again magnetic attraction between the south polar end of magnet 76 and the adjusting screws 78 and 79 brings about an improved functioning of the switch assembly as described above.

As the water level is raised within the boiler in response to the supply pump's operation, the float assembly will responsively move upwardly to reverse the above sequential operation of the switch assembly causing a reversal of the pivotal movement of the two secondary magnets 75 and 76 and sequentially turn off the visible or audible alarm system associated in circuit with terminal connectors 65, close the circuit to the burner in circuit with terminal connectors 64, open the circuit through terminal connectors 62 to shut down the water supply pump and close the circuit through terminal connectors 63 to energize the visible or audible alarm system associated therewith.

It will be appreciated that the desired time delay in the sequential operation of the several circuits controlled by the secondary magnets 75 and 76 respectively, may be regulated by the vertical spacing of the pivotal axes for such secondary magnets and by the adjustment in or out of the adjusting screws 78 and 79, thereby to regulate the throw necessary to make and break the circuits associated with the pairs of terminal connectors 62 through 65. Thus it will be recognized that great flexibility in operating characteristics and design is readily obtained with the mechanism 10, as I have set forth herein.

In Figures 3 and 4 of the drawings I have illustrated a secondary or modified form of my invention which is directed to a water or liquid level responsive switch mechanism similar to that heretofore described, except that such is to be mounted within an auxiliary float chamber instead of directly into the interior of the boiler in contradistinction to my previously described mechanism 10. It will be appreciated that the modified switch mechanism 100 embodies similar principles to those described heretofore and that its operating characteristics are of a like character with the switch mechanism 10, illustrated in Figures 1 and 2.

In particular it will be noted that the modified switch mechanism 100 is to be mounted in an auxiliary float chamber 110 and comprises a float assembly 111, a linkage assembly 112, a switch housing assembly 113, and a switch assembly 114 disposed within the switch housing assembly 113. Since there are several slight variations illustrated in my modified mechanism 100, I shall now describe its features.

It will be noted that auxiliary float chamber 110 is provided with a plurality of pipe connective openings A, B, C, D and E of which opening A is utilized for connection with the steam space above the water level within the boiler with which such is associated, opening B communicates with the water space in the boiler for supplying water to the auxiliary float chamber, opening C is utilized as a drain or blow-off connection and openings D and E are provided for mounting a conventional sight glass or gauge therebetween to indicate the water level within the auxiliary float chamber or may be closed off if desired, all in a conventional manner.

The float assembly of my modified mechanism 100 comprises a spherical float 115 having an internally threaded connector 117 brazed or otherwise rigidly connected to its outer surface, for receiving the lower end of a threaded connector plug 118. Otherwise the float assembly 111 of this modified mechanism is substantially the same as that heretofore described for my mechanism 10.

However, the linkage assembly 112 which supports the float assembly for vertical up and down or rectilinear movement differs slightly from the corresponding assembly described for my mechanism 10. In particular it will be observed that linkage assembly 112 is designed to afford a reduction between the movement of the float assembly and the primary magnet responsively actuated thereby. To accomplish this, a vertical support post 119 is mounted dependingly from the lower side and slightly off center of a closure plate 120 which is fitted tightly over and to the upper end of the auxiliary float chamber to provide an effective seal thereover, much as in mechanism 10. Support post 119 is carried at its upper end by a collar member 123 fastened to the underside of the closure plate 120 by means of stud connectors 124. A pair of parallel spaced channel-shaped bifurcated arms 126 are pivotally connected at one end to collar members 128, which in turn are rigidly secured in vertical spaced relation on the support post 119 by connector pins 129. Each of the collar members 128 has an upwardly extending arm portion 130 which is integrally formed with a transversely disposed trunnion portion 131 for pivotal connection with one of the bifurcated arms by means of pin connectors 132, all in a manner very similar to that utilized in mechanism 10 heretofore described. However, it will be noted that each of the collar members 128 is provided with an inwardly extending stop portion 133, disposed on the opposite side thereof from its upwardly extending arm portion and that such stop portions 133 are disposed beneath the bifurcated arms 126 in the mounted position of the collars 128 on the support post. The stop members 133, of course, interfere with the arms 126 thereby serving to limit the downward arcuate movement of such overlying bifurcated arms 126.

Connection between the outer ends of the bifurcated arms and the float assembly 111 is accomplished by means of a pair of like short connecting rods 134. Each connecting rod 134 is directed toward the support post 119 and beneath the bifurcated arm 126 to which such is pivotally connected. Connection between the inner ends of the short connecting rods 134 and the float 115 is accomplished by means of a tubular member 135 which is threaded to the upper end of plug 118 and rigidly connected to the rods 134 by peened over pin members 136. It will be appreciated that this connection means between the connecting rods and the float assembly is somewhat different from that heretofore described for use in my mechanism 10 but I have found that a connecting arrangement of this order particularly assures an accurate parallel spacing of the two short connector rods 134 and gives a ready and simple means for connecting the inner ends thereof rigidly to the float assembly, as is desired.

It will be observed that the tubular member 135 is mounted for movement through the lowermost of the two bifurcated arms 126, but that such is terminated prior to its entry through the central open portion of the uppermost of the two bifurcated arms, unlike actuating rod 16 of mechanism 10. Provision is made, however, for the offset continuation of the tubular member 135 to connect the float assembly with the primary magnet by employing a vertical extension member 137 which extends between the two bifurcated arms 126 and is pivotally tied thereto by means of pin and cotter key connectors 138 for maintaining such arms in a desired parallel spaced relation. It further will be noted, from Figure 4 in particular, that the extension member 137 comprises a substantially U-shaped metal stamping having a pair of separated arms 139, 139, each of which is pivotally tied by connectors 138 to the adjacent side of the bifurcated arms 126.

Mounted to the upper end of the extension member 137, so as to be positioned in a vertical disposition and slightly offset toward the support post 119, from the axis of tubular member 135, is a primary bar magnet 140. The magnet 140 is connected to the upper end of the extension member 137 by means of a tubular sleeve 141 press fitted coaxially over a lower connecting plug 142, which in turn is riveted solidly to the upper end of member 137. This arrangement of the linkage assembly and the primary magnet 140 provides a reduction in the responsive vertical up and down motion of the primary magnet over the vertical up and down motion of the float assembly, in contrast to the linkage and float assemblies of the previously described mechanism 10, so that the rectilinear movement of primary magnet 140 is not of like amount with the vertical movements of the liquid level responsive float assembly.

Mounted centrally through the closure plate 120 is a tubular vapor or air dome 145 projecting upwardly into the switch housing 113 and which is attached with a sealed connection to plate 120 by means of a threaded connector 146, as illustrated. Air dome member 145 is integrally closed over at its upper end and open at its lower end to provide a seal between float chamber 110 and the interior of the switch housing 113 for receiving the upwardly extending primary magnet 140 through its open lower end.

Preferably the float and linkage assemblies described heretofore are to be constructed of non-corrosive materials, such as brass, bronze or stainless steel, and the parts associated with the primary magnet, such as the tubular member 141, plug 142 and the air dome 145 are of a non-magnetic material such as brass or the like. The closure plate 120 suitably may be formed of a brass or bronze as in my mechanism 10, illustrated in Figures 1 and 2 of the drawings.

The switch housing assembly 113 is constructed of brass or bronze and mounted atop the closure plate 120, as with the housing assembly 13 of my first described mechanism 10. A removable terminal cover plate 147 is also provided to cover over the upper end of the side wall portion 148 of the housing assembly; such being connected thereto by a plurality of vertically disposed and threadingly engageable locking studs 149, all as in the housing assembly of mechanism 10. An internal terminal plate 150 of an insulating material is provided immediately below cover plate 147 and such is attached across the upper interior of the housing side wall portion 148 by means of a plurality of stud connecting bolts 151 or the like. Pairs of terminal connectors, eight in number and numbered 152, 153, 154 and 155 are arranged in cooperating spaced pairs in the terminal plate 150. Also mounted in depending relation from the center of the terminal plate 150 is a yoke member 156 comprising two separated arm portions 157 each of which is provided with an enlarged aperture 158 for receiving one end of a secondary magnet therethrough for reasons which will appear presently.

As in the mechanism 10 of Figures 1 and 2, the switch assembly 114 of my modified mechanism is housed within the switch housing assembly 113 and comprises a pair of magnetic switch actuators having secondary bar magnets 160 and 161 held for pivotal actuation by brackets 162 supported between pairs of separated depending support arms 163. The secondary magnets are again arranged with their like magnetic poles adjacent opposite sides of the air dome 145 and the primary magnet 140 is arranged so that its upper polar end is of a like character with the adjacent polar ends of the secondary magnets 160 and 161. Thus, a magnetic repulsion effect is utilized to pivotally actuate the switch actuator means, as in my mechanism 10 of Figures 1 and 2.

Vertically spaced stop screws 164 and 165 are threadingly mounted through the side walls of the housing portion 148 to limit the arcuate movement of the switch actuators and pivotally mounted bar magnets 160 and 161 by contacting stop plates 166 disposed transversely on the magnet holding brackets 162. It will also be recognized that the yoke member 156 acts as a stop means by limiting the arcuate movement of the secondary magnets which project through the arms 157 via openings 158 therein so that even when the adjusting screws are completely removed from the housing, the secondary magnets are limited to maximum limits of arcuate movement. The stop screws, of course, also act as armatures for magnetic attraction with the adjacent polar ends of the secondary magnets, similar to the related functioning of my mechanism 10. Pairs fo resilient contactor arms 167 and 168, constructed similar to the contactor arms 80 and 81 heretofore described, are mounted atop the magnet holding brackets 162. Each of the paired contactor arms 167 and 168 are provided with silver contactors 169 and 170, respectively, at their upper ends for making and breaking contact between associated pairs of contact buttons 172, 173, 174 and 175 associated respectively with the several pairs of terminal connectors 152, 153, 154 and 155.

The use and operation of the modified level controlled switch mechanism 100, illustrated in Figures 3 and 4, are similar to that described for mechanism 10 of Figures 1 and 2 of the drawings with the exception that the linkage assembly 112 in this modified embodiment provides a reduction between the movement of the primary magnet and the float assembly as described above. The several pairs of terminal connectors 152-155, of course, are connected respectively in circuit, as before, with the water supply pump, the water supply pump visual or audible alarm system, the boiler burner circuit and the audible or visible boiler burner alarm system. Vertical actuation of the primary magnet within the air dome 145 again effects corresponding repulsion of the secondary magnets 160 and 161, positioned adjacent the air dome and exteriorly thereof, to effect the sequential operation of the pump, alarm and boiler control circuits in a manner as described heretofore in association with the primary embodiment of my invention demonstrated in Figures 1 and 2 of the drawings.

By way of general observation, and as related to both of the embodiments of my invention described herein, it should be noted that the air domes 45 and 145, shown in the respective mechanisms 10 and 100, are of a tubular configuration of a rather small diameter to afford only a slight clearance for the coaxially movable primary magnet therein. This type of air dome, while being constructed of rather a light material, is nevertheless capable of withstanding relatively high pressures due to its small diameter thereby adapting such for ready use with high pressure boilers, or the like, to which my present invention is directed. Further, it should be noted that in both embodiments of my invention, the tubular air domes are at all times disposed above the water level within the boiler or the auxiliary float chamber so that they are not subject to deposits of solids carried by the boiler liquid. While such domes may well trap air as well as steam within their interior, the atmosphere therein will be free of liquids carrying solids, dust particles and the like, thus maintaining the movable primary magnets substantially free of encrusting deposits which might interfere with their free operation. The vertical disposition of the air dome above the liquid level further lends to this advantageous feature of maintaining such substantially free of depository materials carried by the liquids within the boiler.

Thus I am able to keep the interior of the air dome and the movable primary magnet substantially free of encrusting deposits and solids carried by the liquids within the boiler to minimize interference from this source with the operation of my level responsive mechanism. I am, therefore, enabled to maintain a substantially free air gap between the movable primary magnet and the interior of the air dome to facilitate prolonged and efficient operation of my switch mechanism as desired.

Further, it will be appreciated that the vertical displacement of the axes of the two secondary magnets, which are influenced by the repulsive effect of the vertically movable primary magnet, provides a simple expedient for accomplishing a sequential operation of the devices connected in electrical circuit with the switches operated in response to pivotal actuation of the secondary magnets while providing a compact and efficient construction for the mechanism involved. It also will be appreciated that the use of the air dome and the closure plate provides a convenient expedient for sealing off the high pressures within the boiler or auxiliary float chamber from the interior of the switch housing which contains the switching mechanism and must therefore be periodically opened for inspection and repairs. This latter feature also saves the delicate switching mechanism from the corrosive effects of the atmosphere within the boiler and readily adapted my mechanism for use with high pressure boilers or distillation and cracking stills for which such is designed.

It will therefore be appreciated that while I have herein shown and described two embodiments in which the features of my invention may occur, its several novel features and principles may be embodied in related devices of other designs without departing from the spirit and scope of my teachings. Therefore, I do not wish to be limited to the specific embodiments herein set forth except as may appear in the following appended claims.

I claim:

1. In a boiler control, a closure plate adapted to be subject to boiler pressure and having an opening therethrough, a tubular dome member closing said opening and extending upwardly from the plate, a primary magnet having a pole adapted to be moved up and down in said dome, a linkage connected to the plate for guiding the magnet for substantially rectilinear motion, and a secondary magnet having a horizontal pivot supported on said plate and having a pole of the same polarity adjacent the said pole of said primary magnet whereby said poles repel each other, such magnetic repulsion causing pivotal movement of said secondary magnet in response to movement of said primary magnet in either direction within said dome, said secondary magnet being disposed substantially horizontally with its aforesaid pole disposed adjacent the outside sidewall of said tubular dome.

2. In a device of the class described, a frame member, a substantially vertical pressure retaining wall of non-magnetic material supported on said frame, a primary bar magnet having its axis substantially parallel to said wall and mounted on said frame for motion in a substantially vertical direction along said wall, a secondary bar magnet pivoted on said frame for swinging motion in a vertical plane with its longitudinal axis generally horizontal and having one pole disposed adjacent said wall, and the primary magnet having a like pole on the other side of the wall at about the level of the secondary magnet, means for rectilinearly raising and lowering the primary magnet, and switch means actuated by pivotal movement of the secondary magnet away from said wall in response to magnetic repulsion thereof as the poles of the two magnets approach one another during both the raising and lowering of said primary magnet.

3. In a device of the class described, a pressure retaining plate, an opening therethrough, a tube of small diameter made of non-magnetic material and having one end seated in said opening and the other end closed off, a primary bar magnet movable endwise in said tube, a secondary bar magnet having one end disposed adjacent the outside wall of the tube and substantially in registration with the adjacent end of the primary magnet, said secondary magnet being mounted for pivotal movement between adjustable limits, means magnetically attractive with the other polar end of said secondary magnet for yieldingly holding the secondary magnet at each limit of its motion, and switch means connected to said secondary magnet for actuation in response to pivotal movement of said secondary magnet effected by movement of said primary magnet in directions both toward and away from the closed end of said tube.

4. In a boiler control, a frame plate having a substantially vertical opening, a substantially vertical tube of non-magnetic metal having its lower end seated in said opening and its upper end sealed to provide a vapor dome, a primary bar magnet adapted to be moved up and down in said vapor dome, a parallellogram linkage means connected to the primary magnet and controlled by a float for moving said primary magnet rectilinearly up and down, said linkage being constructed and arranged to produce a differential in movements between the float and said primary magnet, a secondary bar magnet disposed outside the tube in a substantially horizontal position with its axis generally radial relative to the tube, said latter magnet being pivoted on the frame plate on a substantially horizontal axis to swing in a substantially vertical plane with one end adjacent said tube, said one end thereof being of the same polarity as the upper end of the primary magnet, and switch means connected to the secondary magnet and operable in response to movement of said one end thereof away from said tube upon the approach of the upper end of said primary magnet attending both the up and down motion of the latter within said dome.

5. In a level controlled switch mechanism of the class described, a vertically disposed support rod, a pair of parallel, vertically spaced arm members extending outwardly from said support rod and having pivotal connection at one end therewith, a pair of parallel spaced connecting rods, of a length equal to substantially one-half of the length of said arms, each pivotally connected at one end to the outer arcuately movable other end of one of said arms, said connecting rods extending from their pivotal connection with said arms toward said support rod and in coplanar relation with said arms, and a vertically movable actuating rod, having a float member attached to its lower end, rigidly connected to the arcuately movable other ends of said connecting rods and extending through said arms via central registeringly aligned openings formed in the latter, whereby said actuating rod is supported for substantially rectilinear movement in response to simultaneous arcuate movement of said arms and connecting rods.

6. A level controlled switch mechanism of the class described for actuating a boiler control switching means in response to liquid level changes in the boiler to which such is attached, comprising in combination, a switch housing, a rigid support rod mounted dependingly from the lower side of said housing, a pair of parallel spaced arms, each pivotally connected at one end to said support rod for parallel arcuate movement, an actuating rod positioned in spaced parallel relation to said support rod and movable through said two arms via central openings formed therein, a float member mounted to the lower end of said actuating rod, a magnetic switch actuating means mounted to the upper end of said actuating rod and projecting into said housing for actuating switch means mounted in said housing in response to rectilinear movement of said actuating rod, and a pair of parallel spaced, short connecting rods, each pivotally connected at one end to the arcuately movable other end of one of said arms and rigidly connected at its opposite end to said actuating rod, said connecting rods moving simultaneously and along like arcuate paths relative to said arms whereby said actuating rod and attached float are supported for substantially rectilinear movement in response to liquid level changes within the boiler.

7. In a level controlled switch mechanism for use in actuating a boiler control switching system in response to liquid level changes within the boiler, the combination comprising, a switch housing attachable to the boiler, a rigid support rod mounted in depending vertical relation from the lower side of said housing, a vertically disposed actuating rod positioned below said housing and in spaced relation to said support rod, a float member attached to the lower end of said actuating rod, a permanent bar magnet mounted coaxially to the upper end of said actuating rod for rectilinear movement therewith, said magnet extending into a vapor dome projecting into said switch housing and sealed therefrom for actuating switch mechanisms, mounted in said housing exteriorly of the dome, in response to vertical movement of said actuating rod, and linkage means for supporting said actuating rod, magnet and float for substantially vertical rectilinear movement, comprising, a pair of parallel spaced bifurcated arms, each pivotally connected at one end to said support rod for parallel arcuate movement, said arms traversing said actuating rod, a pair of short connecting rods, one pivotally connected to the other arcuately movable end of each of said arms for pivotal arcuate movement therebeneath and extending toward said support rod; and rigid connective means joining the other end of each of said connecting rods to said actuating rod, intermediate the ends of the latter, whereby said connecting rods are simultaneously movable with parallel arcuate motion as are said bifurcated arms, but in opposite clockwise sense to the latter's movement, for effecting substantially rectilinear movement of said actuating rod.

8. In a device in the class described, a frame member, a pressure retaining wall of non-magnetic material supported on said frame member, a primary bar magnet having its longitudinal axis substantially parallel to said wall and mounted for substantially rectilinear reciprocation adjacent said wall, a secondary bar magnet pivoted on said frame for swinging motion in a plane substantially coincident with the longitudinal axis of said primary magnet, said secondary magnet having its longitudinal axis disposed generally transverse to the longitudinal axis of said primary magnet with one pole thereof adjacent one side of said wall, said primary magnet having a like pole on the opposite side of said wall at substantially the level of said secondary magnet, and switch means actuated by the pivotal movement of said secondary magnet away from said wall in response to its magnetic repulsion occurring as the poles of said two magnets approach one another during movement of said primary magnet in both directions of its reciprocal movement.

LEOPOLD J. KMIECIK.

References Cited in the file of this patent
UNITED STATES PATENTS

| Number | Name | Date |
|---|---|---|
| 927,129 | Dombrowski | July 6, 1909 |
| 2,292,648 | Moore | Aug. 11, 1942 |
| 2,495,416 | McCauley | Jan. 24, 1950 |